K. KIEFER.
FILTER ELEMENT.
APPLICATION FILED MAR. 27, 1916.

1,311,280.

Patented July 29, 1919.

Witnesses

Inventor
Karl Kiefer

UNITED STATES PATENT OFFICE.

KARL KIEFER, OF CINCINNATI, OHIO.

FILTER ELEMENT.

1,311,280.  Specification of Letters Patent.  Patented July 29, 1919.

Application filed March 27, 1916. Serial No. 86,984.

*To all whom it may concern:*

Be it known that I, KARL KIEFER, a citizen of the United States, residing at Cincinnati, in the county of Hamilton and State of Ohio, have invented new and useful Improvements in Filter Elements, of which the following is a specification.

My invention relates to liquid conductors for filters, and particularly to filters which use compressed pulp, such as used in the art of beer and wine filtration.

The object of my invention is to produce a new sanitary and strong liquid conductor, which can be used in direct contact with fibrous compressed pulp, even when moist.

Figure 1:
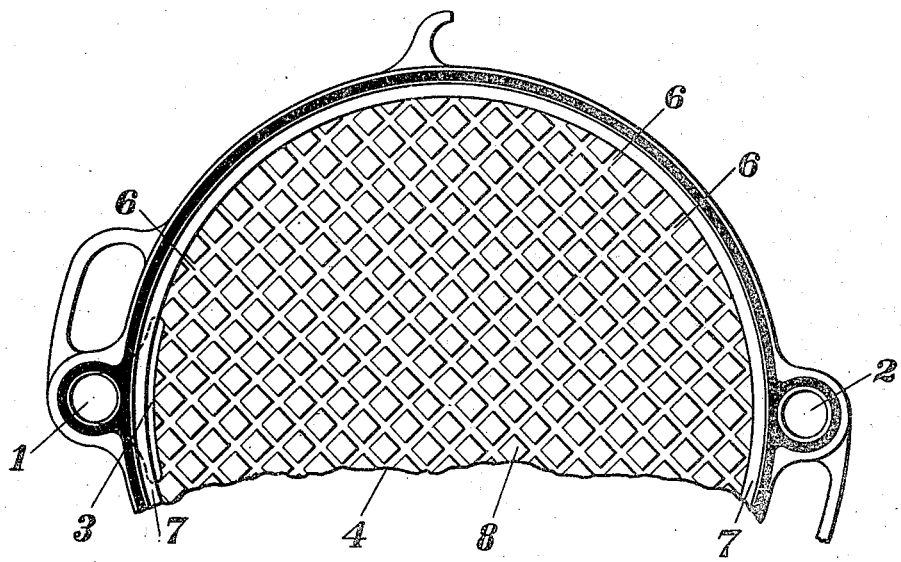
Figure 1 shows a view of this liquid conductor with the filtering layer removed.
Figure 2:
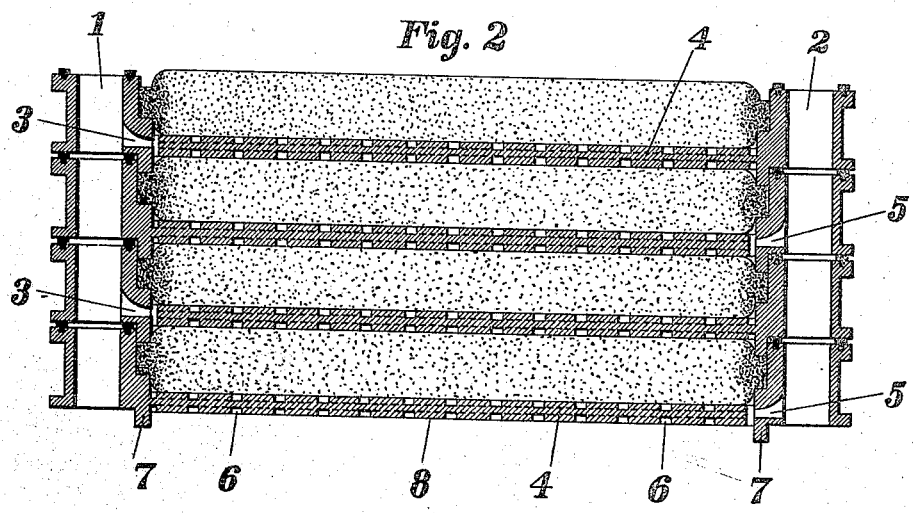
Fig. 2 shows a number of liquid conductors combined with filtering layers, in section. The section is taken so as to cut through both inlet and outlet openings.

This liquid conductor is illustrated in connection with a sectional wall, or battery type filter, but it is also applicable to filters of the drum type, such as patented to me in my Re-issue Patent #12,347, May 18, 1905. My improved liquid conductor is an imperforate one and consists mainly of a solid imperforate plate in which intersecting channels have been milled on both sides to about $\frac{1}{3}$ the depth of the thickness of this metal sheet, leaving another $\frac{1}{3}$ of the sheet solid. These dimensions, however, may be varied without being out of the scope of this invention.

The particular advantage of this liquid conductor is that each side may conduct liquid in all directions independently of each other, and every particle of the liquid can traverse from one place on this liquid conductor to any other place, without the use of peripheral channels, such as heretofore deemed to have been necessary in filters such as, for instance, the Kiefer Patent 1,015,326, the Danziger Patent 1,029,915, the Kiefer Patent 1,002,587, and the Enzinger Patent 393,633.

The further advantage of this liquid conductor is that metal of less thickness is used and a greater area is offered for the exit of the liquid. It will be noted also, that in the drawing as shown, the channels are narrower than the solid square surfaces between the different channels. The inventor has found that this will work very well, for the reason that the filtered liquid needs less of an area for exit than does the unfiltered liquid for an entrance.

By means of the pressure that is upon it, the unfiltered liquid will force the mass entirely away from the inlet liquid conductor whenever the impurities accumulated on the surface of the filter layer present an obstruction to the ingress of the unfiltered liquid. In other words, it is found in this filter that even where there are no channels, and where the filter mass rests upon the squares of the inlet liquid conductor, the filter mass will be found dirty after use, wherever any considerable amount of impurities are to be filtered out, the cloudy liquid compressing the filter mass under the influence of the inlet pressure, forcing it away from the squares, and so presenting new surfaces for the depositing of the impurities, whenever the surfaces that are exposed to the channels become clogged.

By having the channels of substantially rectangular cross-section, I am enabled to use practically any filter mass in the required moist condition without the interposition of fine screens and without making the channels unduly deep and therefore requiring great thickness of the plate. This is due to the comparatively sharp angle which the walls of the channels make with the outer surfaces of the plate; whereas flaring walls, either straight or curved, permit considerable bedding of the filter mass in its moist condition down into the channel, thus greatly decreasing the inlet and outlet capacity of the channels. This support of the filter mass fibers is especially well realized by this substantially rectangular cross-section of the channels in conjunction with the relatively widely extended outer flat surfaces between the channels, as distinguished from comparatively narrow outer surfaces in the ribs of the filter plates as they have been usually made.

In the drawing Fig. 1 shows the liquid conductor in view. The form of the pan is similar to the one shown in my Patent 1,022,587, Fig. 1. The inlets and outlets are 1 and 2 respectively, and are, as common to such filters, alternately arranged so that one plate is an inlet plate and one plate is an outlet plate. As shown in Fig. 1, inlet 1 connects by an opening 3 with both sides of the imperforate liquid conductor, so that it can supply both channeled sides of the liquid conductor 4 with liquid, or, in the case of the outlet conductors, drain them by openings 5, which terminate in the outlet openings 2. The openings 3 and 5 are broadened somewhat where they are connecting to channels of the liquid conductor 4, so as to embrace several of the channels 6. These channels, however, are terminated by the circular compression elements 7, which are well known and which are particularly well described in my Patent 1,023,254, and in their application to the drum type of filter, in my Patent 1,015,326. Numerals 8 show the solid squares between the channels.

The noticeable difference in this construction as stated, is the absence of the peripheral channels on both sides of the new liquid conductor, that are made entirely unnecessary by this improved invention, which also gives a greater strength at the point of fastening these liquid conductors to the compressing elements 7. My liquid conductor might be manufactured integrally with the filter frame, but preferably same is made of rolled or hard metal and then inserted into the frame.

Having described my invention, what I claim as new and desire to secure by Letters Patent is—

1. In a filter, in combination with filter layers of compressed moist pulp, an imperforate liquid conductor between said layers consisting of a single relatively thin flat plate having intersecting channels in both of its flat sides, and said channels opening through the peripheral edges of said plate, to receive or discharge liquid without any other peripherally located conducting means in the plate, said channels being of substantiallly rectangular cross section whereby their sides are at substantially right angles with the flat surfaces of the plate between the channels, so that said pulp of said filter layers is adequately supported upon said flat surfaces and across said channels without materially bedding in said channels.

2. In a filter, in combination with filter layers of compressed moist pulp, an imperforate liquid conductor between said layers consisting of a single relatively thin flat plate having intersecting channels in both of its flat sides, opening through the peripheral edges of the plate to receive or discharge said liquid without any other peripherally located conducting means in the plate.

In testimony whereof I have hereunto signed my name in the presence of two subscribing witnesses.

KARL KIEFER.

Witnesses:
M. A. HARRINGTON,
E. E. FINCH.

Copies of this patent may be obtained for five cents each, by addressing the "Commissioner of Patents, Washington, D. C."